(12) United States Patent
Fang

(10) Patent No.: US 6,447,002 B1
(45) Date of Patent: Sep. 10, 2002

(54) FOLDING COLLAPSIBLE LUGGAGE CART

(76) Inventor: Chih Chung Fang, No. 566, Chung Hua Road, Pa Te, Taoyuan Hsien (TW)

( * ) Notice: Subject to any disclaimer, the term of this patent is extended or adjusted under 35 U.S.C. 154(b) by 0 days.

(21) Appl. No.: 09/854,630

(22) Filed: May 15, 2001

(51) Int. Cl.$^7$ ................................................ B62B 1/12
(52) U.S. Cl. ........................ 280/646; 280/652; 280/655; 280/47.29
(58) Field of Search .................. 280/638, 645, 280/646, 651, 652, 655, 47.17, 47.18, 47.27, 47.29; 190/18 A

(56) References Cited

U.S. PATENT DOCUMENTS

| | | | | |
|---|---|---|---|---|
| 3,998,476 A | * | 12/1976 | Kazmark, Sr. | 280/655 |
| 4,281,849 A | * | 8/1981 | Chandick et al. | 280/655 |
| 4,540,196 A | * | 9/1985 | Paping et al. | 280/646 |
| 4,684,141 A | * | 8/1987 | Nunokawa | 280/655 |
| 4,858,940 A | * | 8/1989 | Cheng | 280/655 |
| 5,586,775 A | * | 12/1996 | Cheng | 280/47.18 |
| 5,590,897 A | * | 1/1997 | Tsai | 280/47.29 |
| 6,102,433 A | * | 8/2000 | Stevens | 280/646 |

FOREIGN PATENT DOCUMENTS

| | | | | |
|---|---|---|---|---|
| CH | 655696 | * | 5/1986 | 280/47.17 |
| FR | 93927 | * | 6/1969 | 280/47.17 |
| FR | 2335384 | * | 7/1977 | 280/645 |

* cited by examiner

*Primary Examiner*—Frank Vanaman
(74) *Attorney, Agent, or Firm*—Troxell Law Office PLLC

(57) ABSTRACT

A folding collapsible luggage cart includes a fixed bearing plate, two movable bearing plates hinged to the fixed bearing plate at two sides and equipped with a respective wheel, a sliding plate coupled to the fixed bearing plate by a dove-tailed joint and adapted to lock/unlock the movable bearing plate, a retractable handle assembly pivoted to the fixed bearing plate, a sliding locking plate adapted to lock the retractable handle assembly in the operative position.

3 Claims, 5 Drawing Sheets

FOLDING COLLAPSIBLE LUGGAGE CART

BACKGROUND OF THE INVENTION

The present invention relates to a luggage cart and, more particularly to a folding collapsible luggage cart that can be folded up and received in the collapsed condition to minimize space occupation when not in use.

A variety of luggage carts have been disclosed, and have appeared on the market. Conventional luggage carts occupy much storage space when not in use. In order to save storage space, various folding collapsible luggage carts have been developed. However, these conventional folding collapsible luggage carts are still not satisfactory in function. When collapsed, the wheels are still maintained in vertical, i.e., the wheels cannot be turned to a horizontal position to reduce space occupation in vertical direction. According to conventional designs, the front foot member is coupled to the bottom sidewall of the luggage bearing plate by a plug joint. When moving over an uneven floor surface, the Front foot member may be forced to fall from the luggage bearing plate. Furthermore, because conventional folding collapsible luggage carts simply use a back handle to support the loaded luggage on the luggage bearing plate, the loaded luggage may be forced to fall from the luggage bearing plate when moving the cart over an uneven floor surface.

SUMMARY OF THE INVENTION

The present invention has been accomplished provide a folding collapsible luggage cart, which eliminates the aforesaid drawbacks. It is one object of the present invention to provide a folding collapsible luggage cart, which can easily be set between the extended position and the collapsed position. It is another object of the present invention to provide a folding collapsible luggage cart, which is maintained in a flat manner to minimize space occupation when collapsed. According to one aspect of the present invention, the folding collapsible luggage cart comprises a fixed bearing plate, two movable bearing plates hinged to the fixed bearing plate at two sides and equipped with a respective wheel, a sliding plate coupled to the fixed bearing plate by a dovetailed joint and adapted to lock/unlock the movable bearing plate, a retractable handle assembly pivoted to the fixed bearing plate, a sliding locking plate adapted to lock the retractable handle assembly in the operative position. According to another aspect of the present invention, the movable bearing plates each comprise a bottom block, and a control rod longitudinally extended through the bottom block. The control rod has a curved front end adapted to work as a stand for supporting the folding collapsible luggage cart on the floor after the movable bearing plates have been extended out and locked in the extended position, and a curved rear end coupled to one wheel for enabling the respective wheel to be turned with the control rod between a horizontal position and a vertical position.

DETAILED DESCRIPTION OF THE PREFERRED EMBODIMENT

Figure 1:
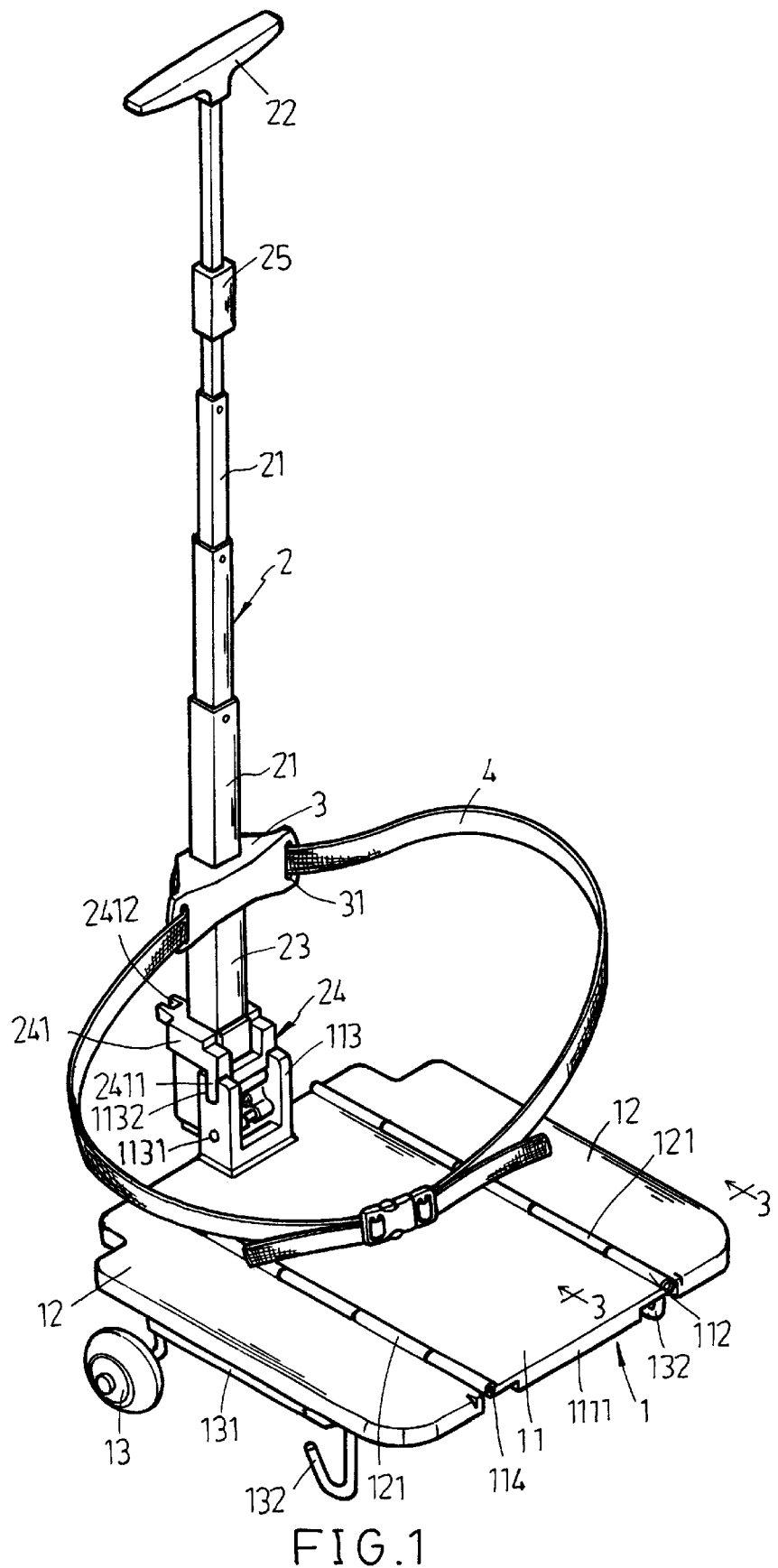
FIG. 1 is a perspective view of a folding collapsible luggage cart constructed according to the present invention.
Figure 2:
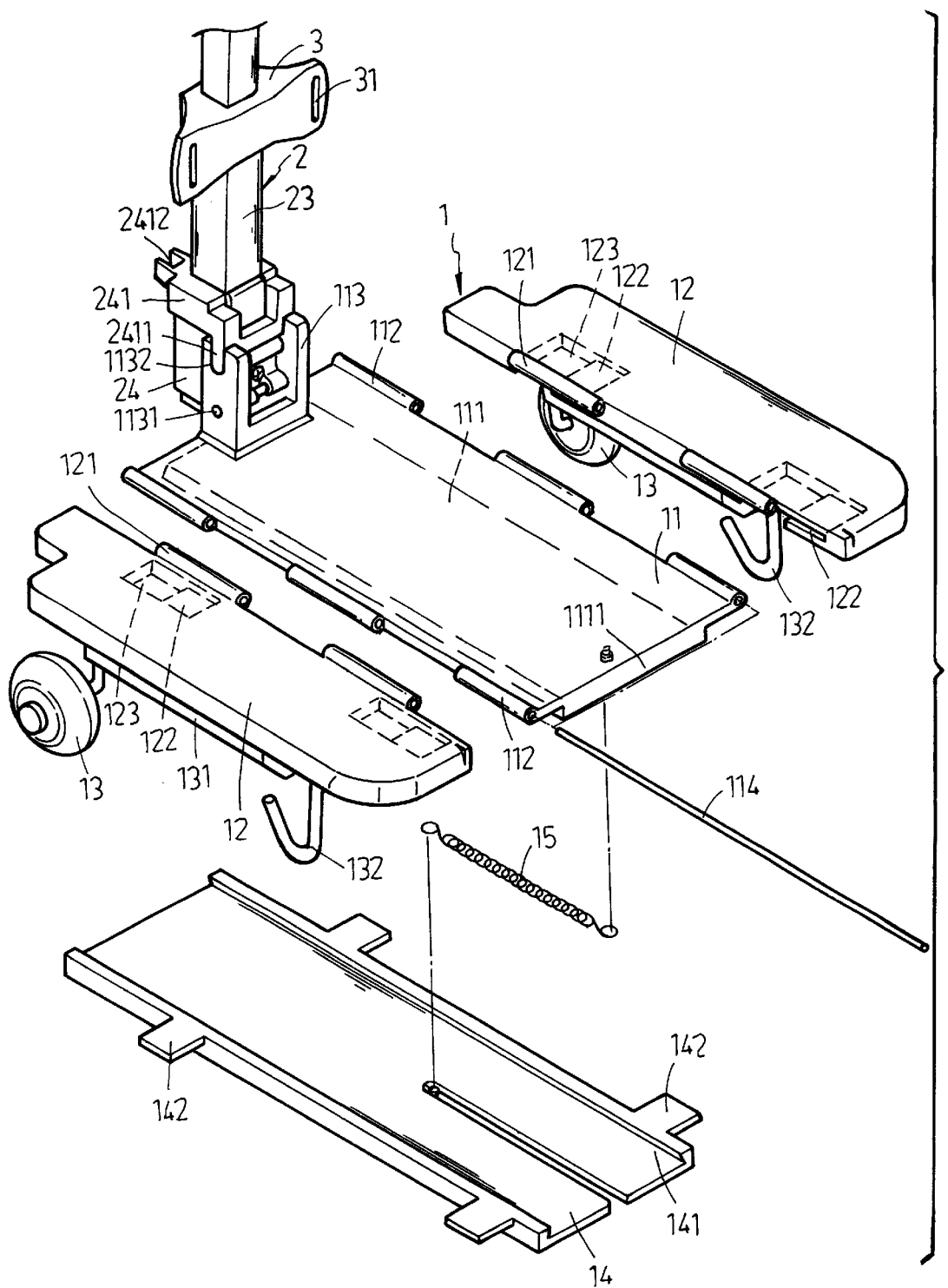
FIG. 2 is an exploded view of the folding collapsible luggage cart according to the present invention.
Figure 7:
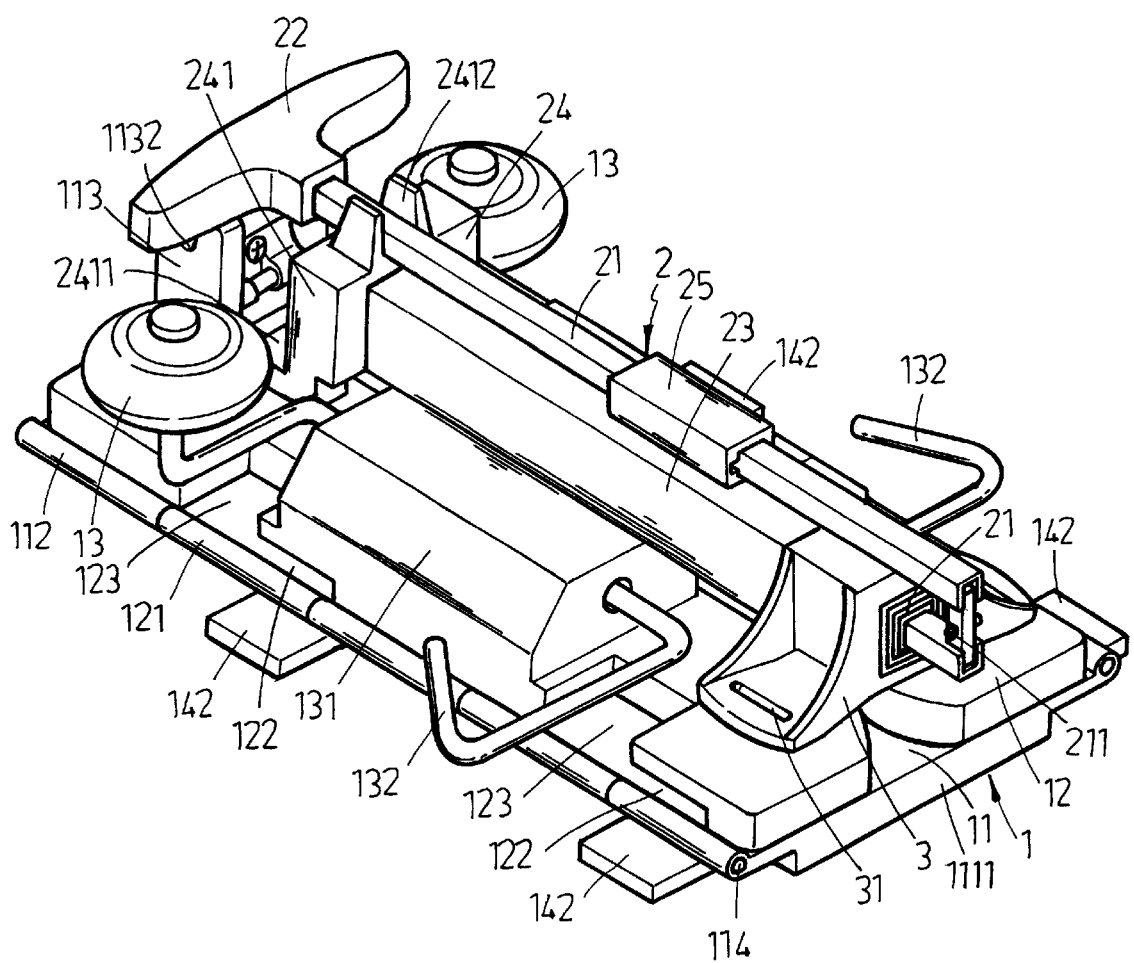
FIG. 7 is a perspective view showing the folding collapsible luggage cart collapsed.

Referring to FIGS. 1, 2 and 7, a folding collapsible luggage cart in accordance with the present invention is generally comprised of a cart body 1, a retractable handle assembly 2, and a locating block 3.

Referring to FIGS. 1 and 2 again, the cart body 1 comprises a fixed bearing plate 11, a sliding plate 14, two movable bearing plates 12, and two wheels 13. The fixed bearing plate 11 comprises two longitudinal series of barrels 112 arranged along two opposite lateral sides thereof, a dovetail block 111 longitudinally raised from the bottom sidewall thereof, and a substantially U-shaped holder block 113 upwardly extended from the rear side of the top sidewall thereof. The U-shaped holder block 113 comprises two top locating notches 1132 respectively disposed at the top of each of the two parallel upright arms thereof. The movable bearing plates 12 each have a longitudinal series of barrels 121 arranged along one lateral side thereof and respectively pivotally coupled to the two longitudinal series of barrels 112 of the fixed bearing plate 11 by a respective pivot axle 114. Therefore, the movable bearing plates 12 are respectively hinged to the fixed bearing plate 11 at two sides, and can be respectively turned inwards and closely attached to the top sidewall of the fixed bearing plate 11.

The movable bearing plates 12 each comprises two bottom positioning slots 122 and two bottom guide grooves 123 respectively disposed in communication with the bottom positioning slots 122, a bottom block 131, a control rod 132 longitudinally extended through the bottom block 131. The control rod 132 has two curved opposite ends. The wheels 13 are respectively coupled to one end of the control rod 132 of each of the movable bearing plates 12. The other end of the control rod 132 of each of the movable bearing plates 12 serves as a stand to support the luggage cart on the floor after the movable bearing plates 12 have been extended out of the fixed bearing plate 11.

Figure 3:
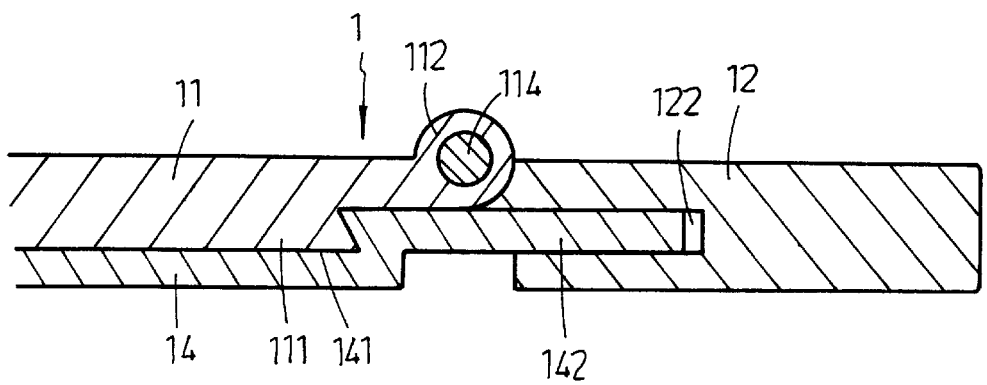
FIG. 3 is a sectional view in an enlarged scale taken along line 3—3 of FIG. 1.
Figure 4:
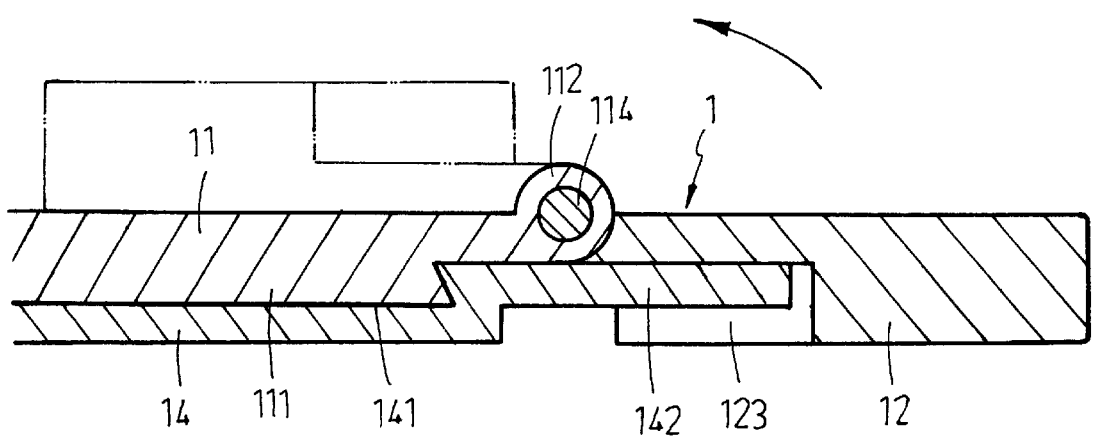
FIG. 4 is an action view of FIG. 3 showing the receiving action of the movable bearing plate.
Figure 5:
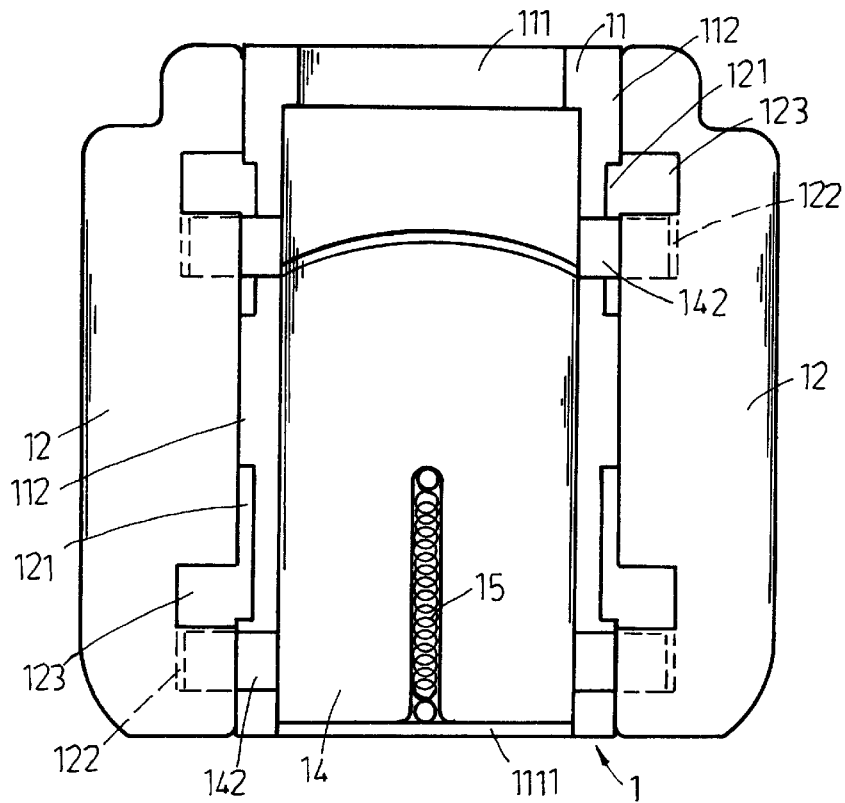
FIG. 5 is a plain view of the cart body showing the movable bearing plates locked.
Figure 6:
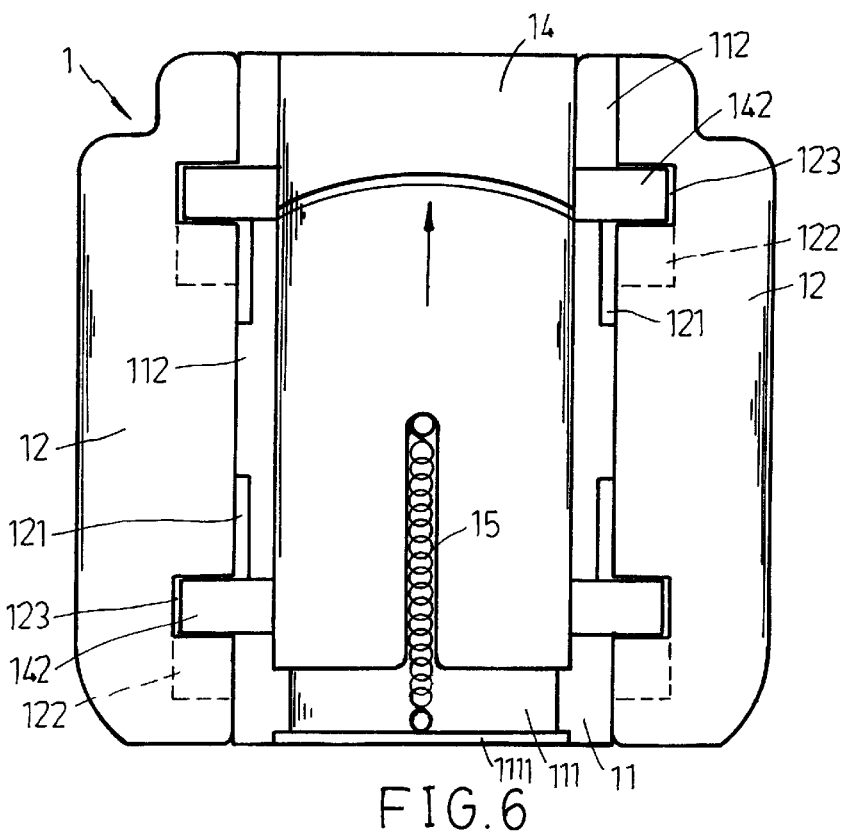
FIG. 6 is similar to FIG. 5 but showing the sliding plate moved to the unlocking position.

Referring to FIGS. from 2 through 6, the sliding plate 14 has a longitudinally extended dovetail groove 141 coupled to the dovetail block 111 of the fixed bearing plate 1, and two pairs of positioning butts 142 symmetrically disposed at two opposite lateral sides thereof. A front bumper 1111 is transversely disposed at the front side of the bottom sidewall of the fixed bearing plate 11 to limit forward movement of the sliding plate 14 on the dovetail block 111 of the fixed bearing plate 1. A spring 15 is connected between the sliding plate 14 and the fixed bearing plate 111 to hold the sliding plate 14 in place and to automatically return the sliding plate 14 backwards after the sliding plate 14 being pulled. When extending out the movable bearing plates 12, the sliding plate 14 is pulled backwards along the dovetail block 111 of the fixed bearing plate 11 to move the butts 142 to the bottom guide grooves 123 of the movable bearing plates 12 respectively, and then the sliding plate 14 is released from the hand, enabling the sliding plate 14 to be pulled forwards by the spring 15 and stopped at the front bumper 1111 of the fixed bearing plate 11, and at this time the butts 142 are respectively engaged into the bottom positioning slots 122 of the movable bearing plates 12 to lock the movable bearing plates 112 in the extended position in flush with the fixed bearing plate 11. FIGS. 3 and 5 show the butts 142 respectively engaged into the bottom positioning slots 122 of the movable bearing plates 12 to lock the movable bearing plates 12 in the extended position. When pulling the sliding plate 14 backwards to move the butts 142 out of the bottom positioning slots 122 into the bottom guide grooves 123 (see FIGS. 4 and 6), the movable bearing plates 12 are unlocked, and can be turned from the extended position to the received position. After the movable bearing plates 12 have been received at the top side of the fixed bearing plate 11, the control rod 132 of each movable bearing plate 12 is turned in one direction to move the respective wheel 13 from the vertical position to the horizontal position to minimize space occupation of the luggage cart (see FIG. 7).

Referring to FIGS. 1 and 2, the retractable handle assembly 2 comprises a coupling block 24 pivoted to the U-shaped holder block 113 of the fixed bearing plate 11 by pivots 1131 and turned relative to the U-shaped holder block 113 between a vertical position shown in FIG. 2 and a horizontal position shown in FIG. 7, a sleeve 23 fixedly fastened to the coupling block 24, a sliding locking plate 241 longitudinally slidably coupled to the sleeve 23 and adapted to lock the retractable handle assembly 2 in the operative position (see FIG. 1), a retractable handlebar 21 hinged to the sleeve 23, a handgrip 22 fixedly connected to one end of the retractable handlebar 21 outside the sleeve 23, and a sliding locking barrel 25 longitudinally slidably coupled to the retractable handlebar 21 and adapted to lock the upper section of the retractable handlebar 21 in the operative position. The sliding locking plate 241 comprises an engagement portion 2411, and a rod seat 2412. After the coupling block 24 has been turned with the retractable handle assembly 2 the vertical operative position as shown in FIG. 1, the sliding locking plate 241 is lowered on the sleeve 23 to force the engagement portion 2411 into engagement with the top locating notches 1132 of the U-shaped holder block 113 of the fixed bearing plate 11 to lock the retractable handle assembly 2 in the vertical operative position. On the contrary, after disengagement of the sliding locking plate 241 from the top locating notches 1132 of the U-shaped holder block 113 of the fixed bearing plate 11, the coupling block 24 is turned with the retractable handle assembly 2 from the vertical operative position shown in FIG. 1 to the collapsed horizontal position shown in FIG. 1, and then the sliding locking barrel 25 is pulled upwards to unlock the upper section of the retractable handlebar 21, for enabling the upper section of the retractable handlebar 21 to be turned backwards and closely attached to the sleeve 23 and rested in the rod seat 2412 of the sliding locking plate 241. After the retractable handle assembly 2 has been extended out, the sliding locking barrel 25 is moved to the connection between the first (upper) section and second section of the retractable handlebar 21 and forced into engagement with a raised portion 211 of the retractable handlebar 21 to lock the first and second sections of the retractable handlebar 21 in a longitudinally aligned condition.

Further, the locating block 3 is fixedly mounted on the sleeve 23 of the retractable handle assembly 2, having two insertion holes 31 at two sides, and a harness 4 is installed in the insertion holes 31, and adapted to secure the loaded luggage in position.

A prototype of folding collapsible luggage cart constructed with the features of FIGS. 1~7. The folding collapsible luggage cart functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A folding collapsible luggage cart comprising:
    a fixed bearing plate, said fixed bearing plate comprising a top sidewall, a bottom sidewall, a longitudinal dovetail block integral with said bottom sidewall, and a holder block upwardly extended from said top sidewall near a rear side of said fixed bearing plate, said holder block comprising at least one locating notch at a top side thereof;
    two movable bearing plates respectively coupled to two opposite lateral sides of said fixed bearing plate by hinge means and turned between a received position where said movable bearing plates are respectively attached to the top sidewall of said fixed bearing plate and an extended position where said movable bearing plates are disposed in flush with said fixed bearing plate, said movable bearing plates each comprising a plurality of positioning slots, and a plurality of guide grooves respectively disposed in communication with said positioning slots;
    a sliding plate coupled to said dovetail block of said fixed bearing plate and adapted to lock said movable bearing plates in said extended position, said sliding plate comprising a plurality of butts symmetrically disposed at two opposite lateral sides thereof, and a longitudinal dovetail groove coupled to said dovetail block of said fixed bearing plate for enabling said sliding plate to be moved on said dovetail block of said fixed bearing plate between a first position where said butts are respectively moved to the guide grooves of said movable bearing plates for enabling said movable bearing plates to be turned relative to said fixed bearing plate between said received position and said extended position, and a second position where said butts are moved into the positioning slots of said movable bearing plates to lock said movable bearing plates in said extended position after said movable bearing plates have been extended out;
    two wheels respectively coupled to said movable bearing plates; and
    a folding collapsible retractable handle assembly pivoted to said holder block of said fixed bearing plate, said folding collapsible retractable handle assembly comprising a coupling block pivoted to said holder block of said fixed bearing plate by pivot means and turned relative to said holder block between a horizontal position and a vertical position, a sleeve fixedly fastened to said coupling block, a sliding locking plate moved along said sleeve and adapted to lock said coupling block in said vertical position, said sliding locking plate comprising an engagement portion, which is moved with said sliding locking plate in and out of said at least one locating notch of said holder block to lock/unlock said coupling block, a folding collapsible retractable handlebar, and a handgrip fixedly fastened to one end of said folding collapsible retractable handlebar outside said sleeve.

2. The folding collapsible luggage cart of claim 1 wherein said movable bearing plates each comprise a bottom block, and a control rod longitudinally extended through said bottom blocks, said control rod each having a curved front end adapted to work as a stand for supporting the folding collapsible luggage cart on a floor after said movable bearing plates have been extended out and locked in said extended position, and a curved rear end coupled to one of said wheels for enabling the respective wheel to be turned with said control rod between a horizontal position and a vertical position.

3. The folding collapsible luggage cart of claim 1 wherein said sliding locking plate comprises a rod seat adapted to receive said folding collapsible retractable handlebar when said folding collapsible retractable handle assembly is collapsed.

* * * * *